Figure 1:
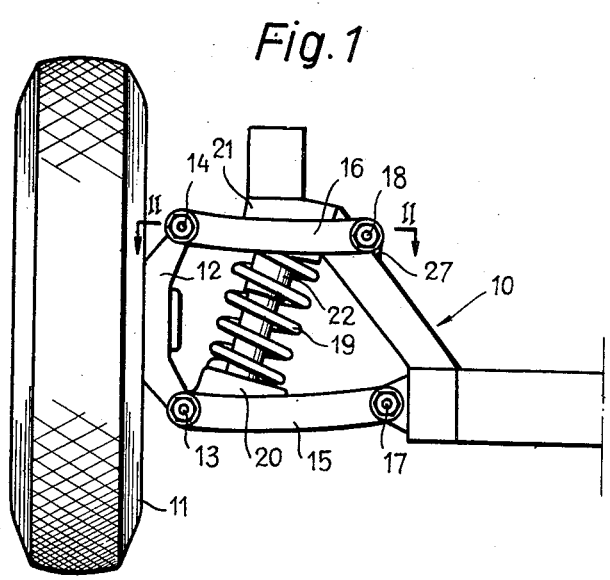

Sept. 19, 1961    A. BOSCHI ET AL    3,000,657
RESILIENT JOINT FOR A SUSPENSION SYSTEM
Filed March 30, 1960

United States Patent Office 3,000,657
Patented Sept. 19, 1961

3,000,657
RESILIENT JOINT FOR A SUSPENSION SYSTEM
Antonio Boschi, Alessandro Franceschetti, and Giovanni Martorana, Milan, Italy, assignors to Societa Applicazioni Gomma Antivibranti S.A.G.A., S.p.A., Milan, Italy
Filed Mar. 30, 1960, Ser. No. 18,646
Claims priority, application Italy Apr. 23, 1959
1 Claim. (Cl. 287—85)

This invention relates to resilient joints, such as the joints frequently used in motor vehicle steering linkages and suspensions and many other applications. The component elements employed in such joints essentially comprise a tubular layer of rubber enclosed between two concentrical metal bushings, the outer bushing being normally encased in an eyeshaped member and the inner bushing being fitted on a bolt member.

Generally, the fit between the bushings and the respective eye and bolt members is a tight one, so as to avoid sliding friction between the members and bushings. In such joints, the rubber layer interposed between the bushings is subject to all kinds of mutually combined stresses. The stresses contemplated by this invention are those which at the relative pivotal movement of the members around the axis of the bolt member give rise to a resisting torque, which increases on the increase of the deflection angle between the members thereby opposing an increasing resistance towards the relative pivotal movement of the members. This fact is in general undesired in steering linkages or in vehicle suspensions of the independent type, where it would be desirable to obtain the greatest possible freedom concerning the relative pivotal movements, thereby advantageously limiting the task of the rubber layer to the absorption of those relative movements which differ from the simple rotation around the axis of the bolt.

In this connection pivotal joint structures are known in which the inner bushing for example is free to revolve on the bolt member, but in this case provision must be made for an effective lubricating means capable of preventing jamming and wear of the parts sliding upon each other. It is further known that it is impossible even by frequent maintenance services to avoid in such joints deformation of parts and substantial friction wear, that result practically in back-lashes, creakings and percussions between the parts.

It is an object of this invention to improve the resilient joints of the type referred to above and its main characteristic feature resides in that one at least of the bushings consists of hard rubber and is freely slidable on the respective member (eye or bolt).

We have found that the so-called hard rubber and particularly synthetic rubber of the nitrile type having a hardness of about 85° Shore has excellent properties of sliding upon metals, with characteristics of self-smoothing, with an entirely negligible wear and are at the same time sufficiently resilient so as not to produce noise and creakings during the work. It was also found that in quite all cases a single application of grease or preferably graphite or graphite-containing grease on assembly in the shop is sufficient to ensure a lasting work of the joint without the above mentioned drawbacks.

Rubber mix compositions suitable for the purposes of this invention should comprise 45–55% by weight nitrile rubber, 35–45% mineral filler such as kaolin and 2–5% zinc or lead stearate. A following vulcanizable mix is advantageously employed:

| | Parts by weight |
|---|---|
| Nitrile rubber | 100 |
| Zinc oxide | 5 |
| Sulfur | 8 |
| Accelerant | 1 |
| Stearic acid | 5 |
| Kaolin | 80 |
| Coloring pigments | 5 |
| Total | 204 |

Figure 2:
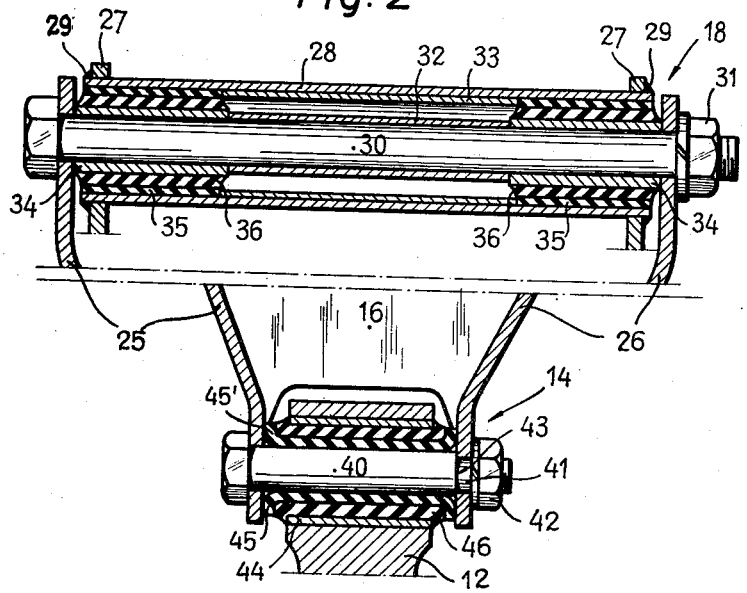

Further features and advantages of the invention will result from the following description, in which reference is made to the accompanying drawing, wherein:

FIGURE 1 is a schematic front view of an independent suspension of the so-called "articulated quadrilateral" type, equipped with resilient joints in accordance with the invention and FIGURE 2 is a schematic horizontal sectional view substantially on the line II—II of FIGURE 1.

In FIG. 1 reference 10 generally denotes a frame of a motor vehicle one of the wheels of the latter being indicated by 11. The wheel 11 has associated therewith a conventional steering knuckle assembly 12 articulated at 13 and 14 to the respective outer ends of control arms 15, 16, the inner ends of the latter being articulated respectively at 17 and 18 to two vertically spaced zones on the frame 10. Structures of this kind are known in the art and are mainly equipped with a helical compression spring 19 extending between a base 20 on the arm 15 and a bracket 21 fast with the frame 10.

A telescopical shock absorber 22 is positioned concentrically in the space enclosed by the spring 19.

In this specific case the present invention is applied to pivotal joints in the points of articulation 13, 14, 17 and 18, thereby to provide resilient joints the resilient reaction of which will not affect the flexibility of the suspension as defined by the load-deflection curve of the spring 19. In the embodiment shown on FIG. 2 the control arm 16 is stamped of sheet steel in a manner known in the art and presents in-turned flange-like edges 25, 26 the general shape of this arm in plan view being substantially triangular. Two ears 27, 27 are provided on the frame 10 for pivotally supporting the inner end of the arm 16. A metal sleeve 28 extends between the ears having its ends welded to the latter as shown by 29. The flanges 25 and 26 are crossed by a bolt 30 having a lock nut 31. The bolt 30 is arranged concentrically in the sleeve and is resiliently supported in the sleeve 28 on the opposite ends of the latter by an embodiment of the present invention.

More specifically, two resilient joints are fitted on the bolt length extending between the flanges 25 and 26, the joints being axially spaced therebetween by an inner tubular spacer 32 threaded on the bolt 30 and an outer tubular spacer 33 fitted into the sleeve 28.

Each of the said pivotal joints comprises an inner metal bushing 34, an outer cylindrical bushing 35 of a hard rubber as defined above and a tubular layer of resilient rubber 36 vulcanized or otherwise bonded to the bushings. The hard rubber bushing 35 is slidably fitted in the respective end of the metal sleeve 28. On the contrary, the inner metal bushing 34 is tight fitted on the bolt 30. The metal bushing has furthermore a length somewhat greater than that of the outer bushing 35 and, in the structure shown, the two inner bushings 34, 34 of the two joints are axially clamped with their tubular spacer 32 between the flanges 25, 26 of the arm 16 by means of the nut 31, whereby the bushings 34, 34 cannot rotate or become displaced on the bolt 30. On the contrary the respective outer bushings 35, 35 of hard rubber can rotate in the sleeve 28.

The junction between the arm 16 and the knuckle assembly 12 as shown in FIG. 2 comprises another embodiment of this invention. The flanges 25, 26 are here crossed by a bolt having a full diameter section 40 extending between the flanges and a reduced diameter section 41 slipped into the flange 26 adjacent the nut 42 screwed on the bolt. The section 40 of the bolt acts here as a spacer between the flanges, forming an annular abutment 43 against which the flange 26 is clamped on tightening the nut 42.

The bolt 40, 41 is arranged concentrically in a cylindrical "eye" formed in the knuckle assembly 12 and is supported in the eye by means of a pivotal joint comprising an outer metal bushing 44, an inner bushing 45 of hard rubber as defined above, and a tubular resilient rubber layer 46 vulcanized or otherwise bonded to the bushings. The outer metal bushing 44 is forced into the cylindrical eye in the knuckle assembly 12 so as to not displace itself in respect of the eye. On the contrary, the inner bushing 45 is rotatably slidable on the section 40 of the bolt 40, 41. The ends of the inner bushing 45 project beyond the ends of the outer bushing 44 and are flange-shaped as indicated by 45', the flanges 45' slidably engaging the adjacent surfaces on the flanges 25, 26 of the arm 16.

In both embodiments shown a single application of a graphite-containing grease on the sliding surfaces of the hard rubber bushings 35 and 45 is sufficient for a lasting condition. It is important however that the slidably engaged surfaces be as smooth as possible; this applies to the inner surfaces of the sleeve 28 rotatably supporting the bushings 35, 35 of hard rubber, as well as to the section 40 of the bolt 40, 41 on which the inner surface of the bushing 45 is slidable and rotatable.

Although not particularly illustrated in the drawing, it is to be understood that both bushings confining the tubular layer of resilient rubber between them can be made of hard rubber if desired. It is to be also understood that the structure shown on the drawing discloses an example only of this invention, wherein some details of non-essential character of the suspension shown have been omitted or simplified for purposes of clarity. More or less elaborate structures can be therefore designed by experts in the art within the scope of the appended claim.

What we claim is:

A resilient pivotal joint comprising a pair of concentrically arranged rigid bushings, a tubular layer of a resilient rubber interposed between the bushings and bonded thereto, one of the bushings consisting of a hard rubber having a hardness of about 85° Shore containing 45–55% by weight of nitrile rubber, 35–45% mineral filler and 2–5% zinc stearate, the said one of the bushings having a smooth exposed cylindrical surface.

References Cited in the file of this patent

UNITED STATES PATENTS

| | | |
|---|---|---|
| 131,671 | Eils | Sept. 24, 1872 |
| 1,555,214 | Johnson | Sept. 29, 1925 |
| 1,895,663 | Humphrey et al. | Jan. 31, 1933 |
| 2,272,900 | Saurer | Feb. 10, 1942 |
| 2,778,664 | Herbenar | Jan. 22, 1957 |
| 2,797,929 | Herbenar | July 2, 1957 |

FOREIGN PATENTS

| | | |
|---|---|---|
| 784,089 | France | Apr. 23, 1935 |